United States Patent
Matsuda

(10) Patent No.: US 8,773,466 B2
(45) Date of Patent: Jul. 8, 2014

(54) IMAGE PROCESSING APPARATUS, IMAGE PROCESSING METHOD, PROGRAM, AND IMAGE PROCESSING SYSTEM

(75) Inventor: Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 365 days.

(21) Appl. No.: 13/023,319

(22) Filed: Feb. 8, 2011

(65) Prior Publication Data

US 2011/0205243 A1     Aug. 25, 2011

(30) Foreign Application Priority Data

Feb. 24, 2010   (JP) ................................ P2010-038777

(51) Int. Cl.
*G09G 5/00*       (2006.01)
(52) U.S. Cl.
USPC ............................ 345/633; 345/650; 345/653
(58) Field of Classification Search
CPC combination set(s) only.
See application file for complete search history.

(56) References Cited

U.S. PATENT DOCUMENTS

| 7,519,223 B2 * | 4/2009 | Dehlin et al. ................. 382/203 |
| 2006/0227151 A1 * | 10/2006 | Bannai .......................... 345/633 |

FOREIGN PATENT DOCUMENTS

JP          2002-247602          8/2002

* cited by examiner

*Primary Examiner* — Kee M Tung
*Assistant Examiner* — Leon T Cain, II
(74) *Attorney, Agent, or Firm* — Sherr & Jiang, PLLC

(57) ABSTRACT

There is provided an image processing apparatus including: an input image acquisition unit for obtaining an input image generated by taking an image of a real space; an image recognition unit for recognizing, when a first user-input representing a start of manipulation is detected, a manipulator used for manipulating a virtual object, wherein the manipulator appears in the input image; a calculation unit for calculating, according to a result of the recognition of the manipulator provided by the image recognition unit, a position on a screen of a display device at which the virtual object is to be displayed; a display control unit for displaying the virtual object at the position of the screen of the display device calculated by the calculation unit; and a communication unit for transmitting, when the first user-input is detected, a first notification signal for notifying the start of manipulation to another apparatus displaying the same virtual object.

18 Claims, 13 Drawing Sheets

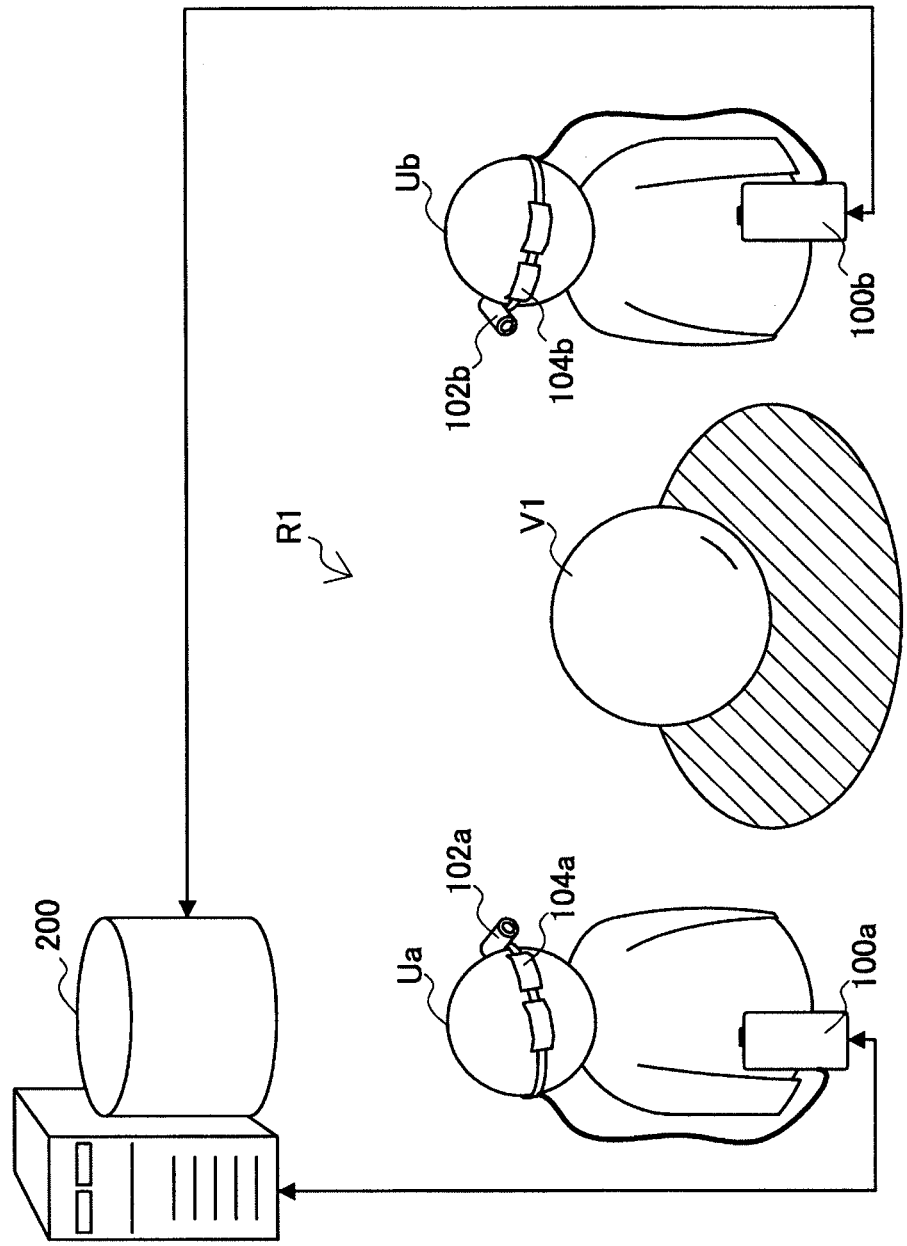

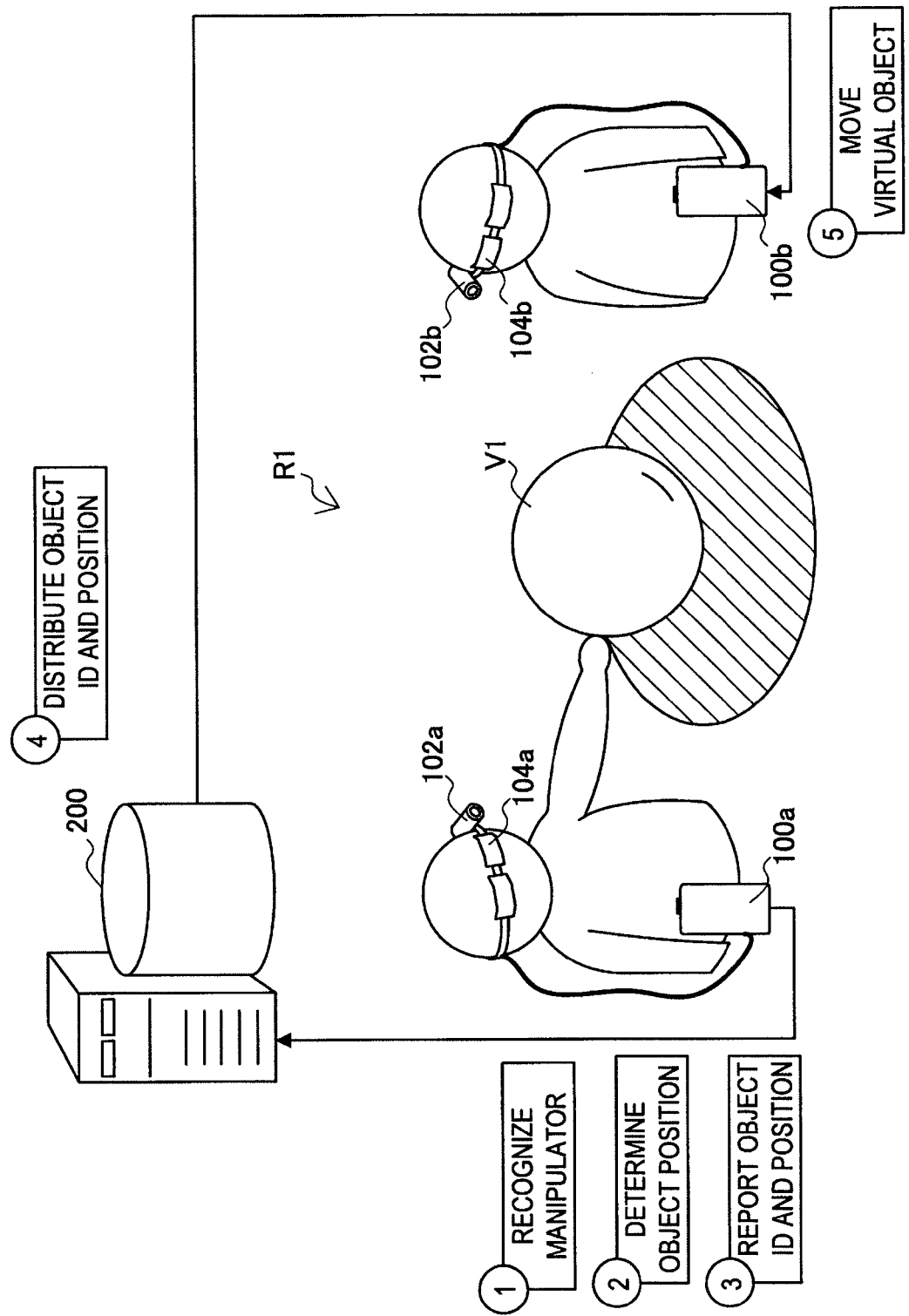

FIG.6
| OBJECT ID | SHAPE | POSITION |
|---|---|---|
| V1 | 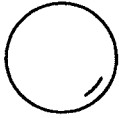 | (X1, Y1, Z1) |
| V2 |  | (X2, Y2, Z2) |
| : | : | : |

| SIGNAL TYPE | TRANSMISSION SOURCE | OBJECT ID | OBJECT POSITION (opt.) |
|---|---|---|---|
| "MANIPULATION START SIGNAL" | 100a | V1 | (X, Y, Z) |

| SIGNAL TYPE | TRANSMISSION SOURCE | OBJECT ID | OBJECT POSITION |
|---|---|---|---|
| "MANIPULATION END SIGNAL" | 100a | V1 | (X, Y, Z) |

| SIGNAL TYPE | TRANSMISSION SOURCE | POSITION / POSTURE |
|---|---|---|
| "SELF POSITION NOTIFICATION SIGNAL" | 100a | THREE-DIMENSIONAL POSITION+ QUATERNION |

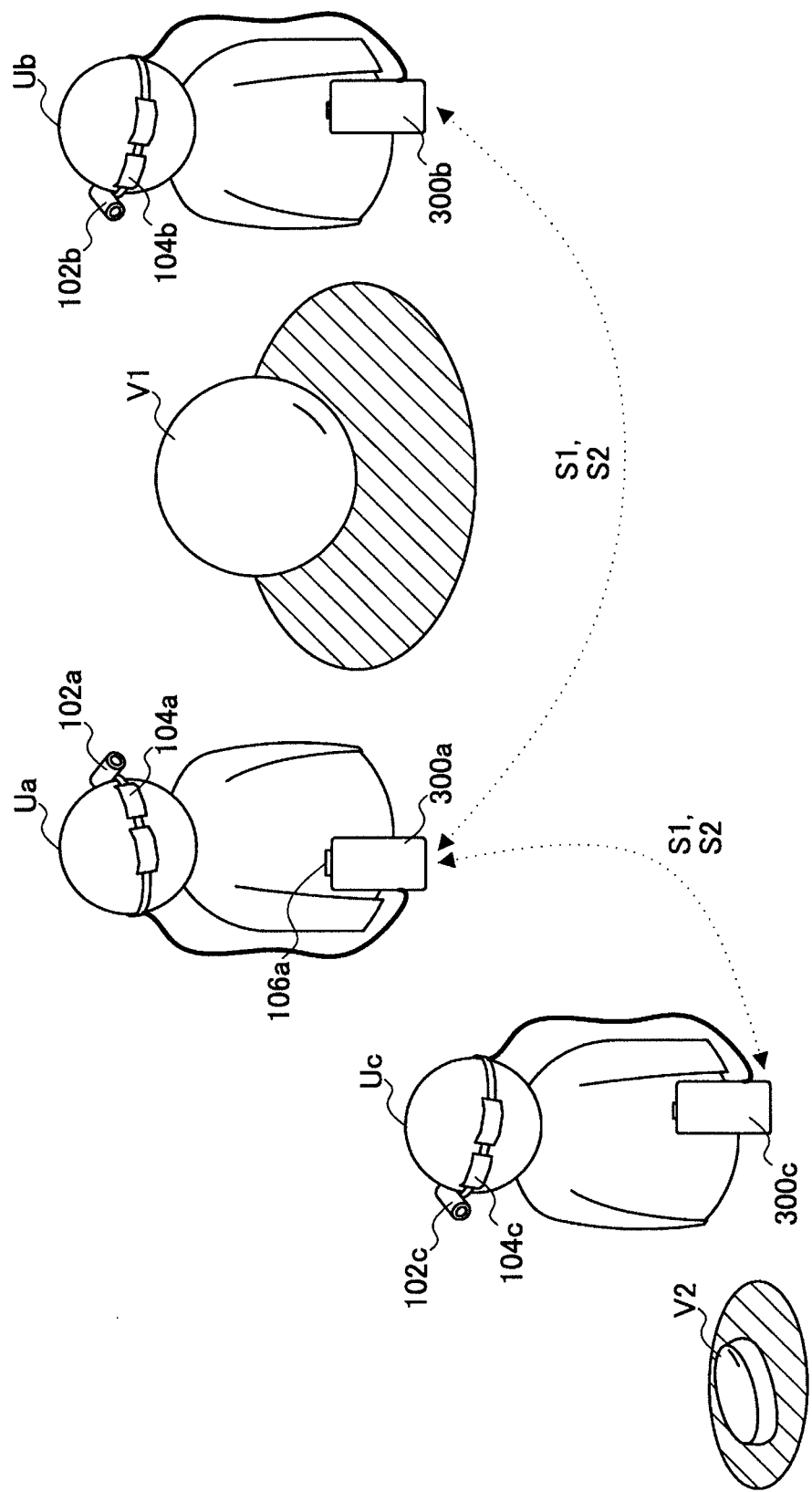

IMAGE PROCESSING APPARATUS, IMAGE PROCESSING METHOD, PROGRAM, AND IMAGE PROCESSING SYSTEM

BACKGROUND OF THE INVENTION

1. Field of the Invention

The present invention relates to an image processing apparatus, an image processing method, a program, and an image processing system.

2. Description of the Related Art

In the past, a technique called MR (Mixed Reality) has been developed to provide a user with an environment in which real world and virtual world are mixed. AR (Augmented Reality), which is an example of MR, provides a user with an image obtained by imaging a real space and augmented with virtual object images or additional information. In the MR, some interfaces are often arranged in the real world in order to allow a user to interact with virtual world or virtual objects. For example, Japanese Patent Application Laid-Open No. 2002-247602 describes an MR system for providing an air hockey game in which multiple users hit a virtual puck with each other by manipulating control boxes, i.e., physical objects in real world.

SUMMARY OF THE INVENTION

However, in a case where one virtual object is shared by multiple users as in a system described in Japanese Patent Application Laid-Open No. 2002-247602, a mismatch may occur between the state of real world and the state of virtual objects due to, e.g., communication delay between apparatuses or a delay of processings. For example, in the MR system described in Japanese Patent Application Laid-Open No. 2002-247602, an MR game apparatus serving as a master obtains input images taken by head mounted displays (HMD) of users, performs predetermined processing on the input images, and distributes output images to the HMDs of the users. In this case, it takes a lot of time to obtain the input images and distribute the output images. Therefore, the state of a user's hand does not match the state of an output image displayed on an HMD, and this mismatch is likely to make the user feel uncomfortable. In a case of a method for projecting virtual objects on a see-through display worn by a user, there is an issue in that the state of real world seen by the user and the virtual objects projected with communication delays and the like may be displaced from each other on the display.

Accordingly, the present invention provides a novel and improved image processing apparatus, an image processing method, a program, and an image processing system, which can provide a mixed reality while reducing the mismatch between the state of real world and the state of virtual objects.

According to an embodiment of the present invention, there is provided an image processing apparatus including: an input image acquisition unit for obtaining an input image generated by taking an image of a real space; an image recognition unit for recognizing, when a first user-input representing a start of manipulation is detected, a manipulator used for manipulating a virtual object, wherein the manipulator appears in the input image; a calculation unit for calculating, according to a result of the recognition of the manipulator provided by the image recognition unit, a position on a screen of a display device at which the virtual object is to be displayed; a display control unit for displaying the virtual object at the position of the screen of the display device calculated by the calculation unit; and a communication unit for transmitting, when the first user-input is detected, a first notification signal for notifying the start of manipulation to another apparatus displaying the same virtual object.

According to the above configuration, when the first user-input representing the start of manipulation is detected, the manipulator appearing in the input image obtained by taking an image of the real space is recognized, and as a result of the recognition, display of the virtual object is controlled. Further, a first notification signal is transmitted from the manipulating-side image processing apparatus to the observing-side image processing apparatus so as to notify the start of manipulation.

The first notification signal may include identification data for identifying the virtual object or position data representing a position of the virtual object.

When a second user-input representing an end of manipulation is detected, the communication unit may transmit a second notification signal to the another apparatus so as to notify the end of manipulation.

The second notification signal may include position data representing a position of the virtual object calculated by the calculation unit.

The image recognition unit may also recognize the manipulator appearing in the input image when the communication unit receives the first notification signal from another apparatus.

The image recognition unit may not recognize the manipulator when the first notification signal received by the communication unit is not related to virtual objects which are to be displayed by the image processing apparatus.

The communication unit may transmit the first notification signal to the another apparatus, when the first user-input is detected and thereafter the manipulator is determined to be in contact with the virtual object as a result of the recognition of the manipulator provided by the image recognition unit.

The communication unit may transmit the first notification signal to an information processing apparatus that manages a group of apparatuses displaying the same virtual object.

The first notification signal may include identification data for identifying the virtual object or position data representing a position of the virtual object, and the first notification signal may be transferred via the information processing apparatus to another apparatus displaying the same virtual object.

The image processing apparatus may further include a storage unit storing a manipulator image representing the manipulator and the image recognition unit may use the manipulator image stored in the storage unit to recognize the manipulator appearing in the input image.

According to another embodiment of the present invention, there is provided an image processing method performed by an image processing apparatus, including the steps of: obtaining an input image generated by taking an image of a real space; detecting a first user-input representing a start of manipulation; transmitting a first notification signal to another apparatus displaying the same virtual object as a virtual object which is to be manipulated by the image processing apparatus so as to notify a start of manipulation; recognizing a manipulator, appearing in the input image, that is used for manipulation of the virtual object; calculating, according to a result of the recognition of the manipulator, a position on a screen of a display device at which the virtual object is to be displayed; and displaying the virtual object at the calculated position of the screen of the display device.

According to another embodiment of the present invention, there is provided a program for causing a computer controlling an image processing apparatus to function as: an input image acquisition unit for obtaining an input image generated by taking an image of a real space; an image recognition unit for recognizing, when a first user-input representing a start of manipulation is detected, a manipulator used for manipulating a virtual object, wherein the manipulator appears in the input image; a calculation unit for calculating, according to a result of the recognition of the manipulator provided by the image recognition unit, a position on a screen of a display device at which the virtual object is to be displayed; a display control unit for displaying the virtual object at the position of the screen of the display device calculated by the calculation unit; and a communication unit for transmitting, when the first user-input is detected, a first notification signal for notifying the start of manipulation to another apparatus displaying the same virtual object.

According to another embodiment of the present invention, there is provided an image processing system including two or more image processing apparatuses, wherein each of the image processing apparatuses includes: an input image acquisition unit for obtaining an input image generated by taking an image of a real space; an image recognition unit for recognizing, when a first user-input representing a start of manipulation is detected, a manipulator used for manipulating a virtual object, wherein the manipulator appears in the input image; a calculation unit for calculating, according to a result of the recognition of the manipulator provided by the image recognition unit, a position on a screen of a display device at which the virtual object is to be displayed; a display control unit for displaying the virtual object at the position of the screen of the display device calculated by the calculation unit; and a communication unit for transmitting, when the first user-input is detected, a first notification signal for notifying the start of manipulation to another apparatus displaying the same virtual object, wherein the image recognition unit also recognizes the manipulator appearing in the input image, when the communication unit receives the first notification signal from another apparatus.

As described above, according to the image processing apparatus, the image processing method, the program, and the image processing system of the present invention, a mixed reality can be provided while reducing the mismatch between the state of real world and the state of virtual objects.

BRIEF DESCRIPTION OF THE DRAWINGS

FIG. 1 is a schematic view illustrating an overview of an image processing system according to an embodiment;

FIG. 2 is an explanatory view illustrating an image processing according to a technique related to the present invention;

FIG. 6 is an explanatory view illustrating an example of object data;

FIG. 8A is an explanatory view illustrating a manipulation start signal according to an embodiment;

FIG. 8B is an explanatory view illustrating a manipulation end signal according to an embodiment;

FIG. 8C is an explanatory view illustrating a self position notification signal according to an embodiment;

FIG. 13 is a schematic view illustrating an image processing system according to a modification.

DETAILED DESCRIPTION OF THE EMBODIMENTS

Figure 3A:
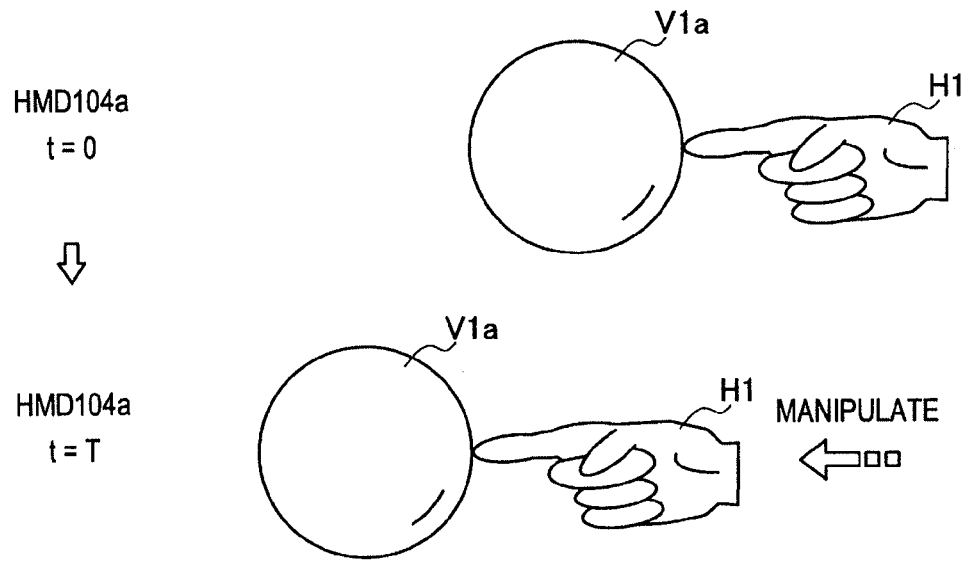
FIG. 3A is a first explanatory view illustrating a mismatch between a state of a real world and a state of a virtual object.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Also, the detailed description of the embodiments is described in a following order.

1. Overview of system
   1-1. Overview of entire system
   1-2. Problems associated with related art
   2. Explanation about image processing apparatus
   2-1. Exemplary configuration of apparatus
   2-2. Flow of processing
   3. Explanation about administration server
   3-1. Exemplary configuration of apparatus
   3-2. Flow of processing
   4. Modification
   5. Conclusion <1. Overview Of System>

[1-1. Overview of Entire System]

FIG. 1 is a schematic view illustrating an overview of an image processing system according to an embodiment of the present invention. FIG. 1 shows an image processing system including image processing apparatuses 100a and 100b and an administration server 200. The image processing apparatus 100a is an apparatus used by a user Ua. The image processing apparatus 100a can communicate with the administration server 200 via a wired communicative connection or a wireless communicative connection. The image processing apparatus 100b is an apparatus used by a user Ub. The image processing apparatus 100b can also communicate with the administration server 200 via a wired communicative connection or a wireless communicative connection.

The image processing apparatus 100a is connected to, for example, a camera 102a and an HMD 104a which the user Ua wears on the head. The camera 102a follows a gaze direction of the user Ua and takes an image of a real world R1 in the gaze direction. Then, the camera 102a outputs a series of input images to the image processing apparatus 100a. The HMD 104a displays the images provided by the image processing apparatus 100a to the user Ua. For example, the image displayed by the HMD 104a is an image including a virtual object V1 in a visual field of the user Ua.

Likewise, the image processing apparatus 100b is connected to, for example, a camera 102b and an HMD 104b which the user Ub wears on the head. The camera 102b follows a gaze direction of the user Ub and takes an image of the real world R1 in the gaze direction. Then, the camera 102b outputs the series of input images to the image processing apparatus 100b. The HMD 104b displays the images provided by the image processing apparatus 100b to the user Ub. In the present embodiment, the image processing apparatuses 100a and 100b share the virtual object V1. That is, the image displayed by the HMD 104b may also include the virtual object V1 in a visual field of the user Ub.

In this specification, when it is not necessary to distinguish the image processing apparatuses 100a and 100b from each other, an alphabet attached as a suffix to a reference numeral may be omitted. In such a case, the image processing apparatuses 100a and 100b are collectively referred to as image processing apparatuses 100. The cameras 102a and 102b (cameras 102), the HMDs 104a and 104b (HMDs 104), and other constituent elements may also be collectively referred to in a similar manner. The number of image processing apparatuses 100 in the image processing system according to the present embodiment is not limited to the example shown in FIG. 1, and may be three or more. For example, the image processing system may further include a third image processing apparatus 100 used by the third user.

The administration server 200 is an information processing apparatus for managing information about the image processing apparatuses 100 in the system. For example, the administration server 200 receives a position and a posture of the camera 102 from each image processing apparatus 100 with a regular interval (or every time a change occurs), and stores the received data to a database. Then, when the administration server 200 receives a signal representing a manipulation of the virtual object V1 from one of the image processing apparatuses 100, the administration server 200 transfers the signal to another image processing apparatus 100 sharing the virtual object V1.

[1-2. Problems Associated with Related Art]

Figure 3B:
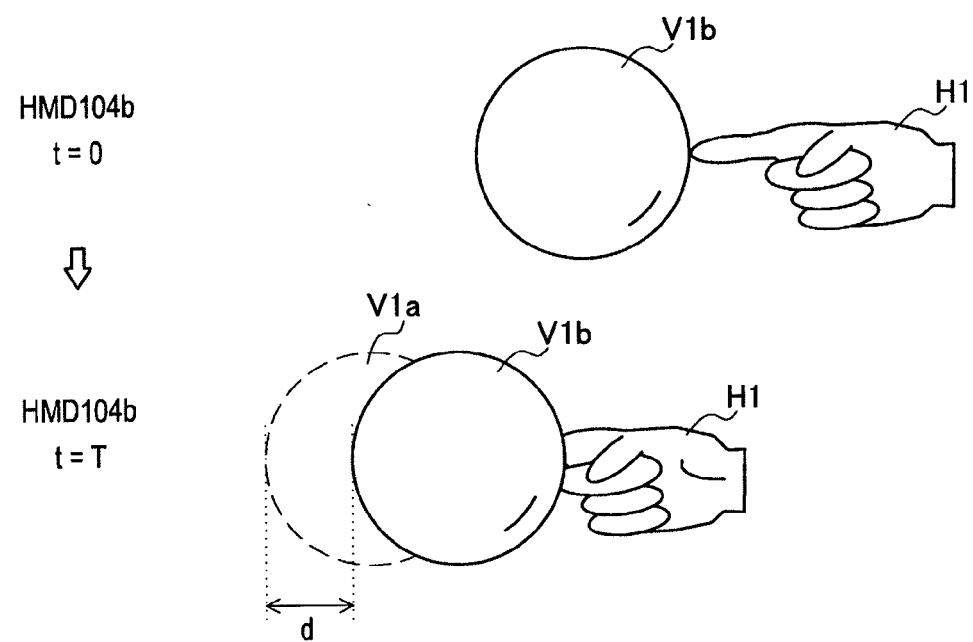
FIG. 3B is a second explanatory view illustrating a mismatch between a state of a real world and a state of a virtual object.

Subsequently, issues associated with techniques related to the present invention in the image processing system as shown in FIG. 1 will be explained with reference to FIG. 2, FIG. 3A, and FIG. 3B. FIG. 2 is an explanatory view illustrating a typical image processing according to related art. FIGS. 3A and 3B are explanatory views each illustrating a mismatch between the state of a real world and the state of a virtual object, which may occur in image processing explained with reference to FIG. 2.

In FIG. 2, a typical flow of image processing according to the related art is shown with boxes indicated with numbers. The numbers indicated in the boxes represent the order of processings. That is, in the related art, the image processings are carried out in the following order.

(1) Recognize a manipulator
(2) Determine an object position
(3) Report an object ID and a position
(4) Distribute the object ID and the position
(5) Move the virtual object (1) Recognize a Manipulator First, one of the image processing apparatuses 100 (in the example of FIG. 2, the image processing apparatus 100a) recognizes a manipulator appearing in an input image. The manipulator is a physical object in a real world used for manipulating a virtual object. The manipulator may be a portion of a human body such as a hand of a user, or may be a predetermined physical object other than the human body.

(2) Determine an Object Position

Subsequently, a new position of the virtual object is determined based on a relationship between the position (or a movement) of the manipulator and the position of the virtual object. For example, in a case where the manipulator moves while the manipulator is in contact with the virtual object, the position of the virtual object can be updated according to movement of the manipulator.

(3) Report an Object ID and a Position

Subsequently, the new position of the virtual object and an object ID (identifier) are reported to the administration server 200.

(4) Distribute the Object ID and the Position

Subsequently, the administration server 200 distributes the new position of the virtual object and the object ID to another image processing apparatus 100 sharing the same virtual object (in the example of FIG. 2, the image processing apparatus 100b).

(5) Move the Virtual Object

Then, in the another image processing apparatus 100 sharing the same virtual object, the virtual object on the screen of the HMD 104 moves.

In the example of FIG. 2, the image processing apparatus 100a performs processings (1) and (2). Alternatively, instead of the image processing apparatus 100a, the administration server 200 may perform the processings (1) and (2) upon receiving the input image from the image processing apparatus 100a. Still alternatively, the administration server 200 may be not arranged. In this case, the new position of the virtual object and the object ID are directly transmitted from the image processing apparatus 100a to the image processing apparatus 100b.

In the image processing as explained above, a time including a time difference and a processing delay caused by communication between the apparatuses has already passed when the image processing apparatus 100b finishes the move of the virtual object. As a result, for example, when the virtual object V1 is overlaid within the image taken by the camera 102b, the image displayed on the HMD 104b has a mismatch between the state of the manipulator and the state of the virtual object V1.

FIGS. 3A and 3B illustrate the above issues in a more specific manner. FIG. 3A shows an example including two frames of images which are apart by a time interval T. The HMD 104a displays the two frames to the user Ua, i.e., a person who manipulates the virtual object V1. On the other hand, FIG. 3B shows an example including two frames of images which are apart by a time interval T. The HMD 104b displays the two frames to the user Ub, i.e., a person who observes the virtual object V1. In this example, the manipulator is a hand of the user.

As shown in FIG. 3A, a manipulator H1 is in contact with a virtual object V1a at a time t=0. Thereafter, at the time t=T, the virtual object V1a moves to the left as the manipulator H1 moves. Even at the time t=T, the manipulator H1 is in contact with the virtual object V1a.

FIG. 3B is the same as FIG. 3A in that the manipulator H1 is in contact with a virtual object V1b at the time t=0. The virtual object V1a and the virtual object V1b are the same object having the same object ID. However, the objects are denoted with different reference numerals for the sake of convenience, because the objects are displayed on different HMDs. Thereafter, at the time t=T, the virtual object V1b moves to the left as the manipulator H1 moves. At the time t=T, the image processing apparatus 100b receives a position of the virtual object in a frame several frames before the current frame due to a time difference and a processing delay caused by communication between the apparatuses. Therefore, the position of the object V1b displayed on the HMD 104b at the time t=T is displaced by a displacement d from the position of the virtual object V1a displayed on the HMD 104a at the time t=T. However, in the real world, the position of the manipulator H1 taken by the camera 102b is the same as the position of the manipulator H1 taken by the camera 102a. As a result, the position of the manipulator H1 does not match the virtual object V1b in the image displayed on the HMD 104b. In the example of FIG. 3B, the manipulator H1 is not in contact with the virtual object V1b but is sticking into the virtual object V1b.

This kind of mismatch occurs in the same manner or more significantly when each HMD 104 is a see-through display which projects only the image of the virtual object onto a screen of each HMD 104.

The mismatch between the state of real world and the state of the virtual object can be suppressed by reducing, as much as possible, the affect of a time difference and a processing delay caused by communication between the apparatuses. In the subsequent chapter, specific configurations of the image processing apparatus 100 and the administration server 200 according to the present embodiment will be explained. The image processing apparatus 100 and the administration server 200 reduces the affect of a time difference and a processing delay caused by communication between the apparatuses when providing mixed reality.

<2. Explanation About Image Processing Apparatus>
[2-1. Exemplary Configuration of Apparatus]

Figure 4:
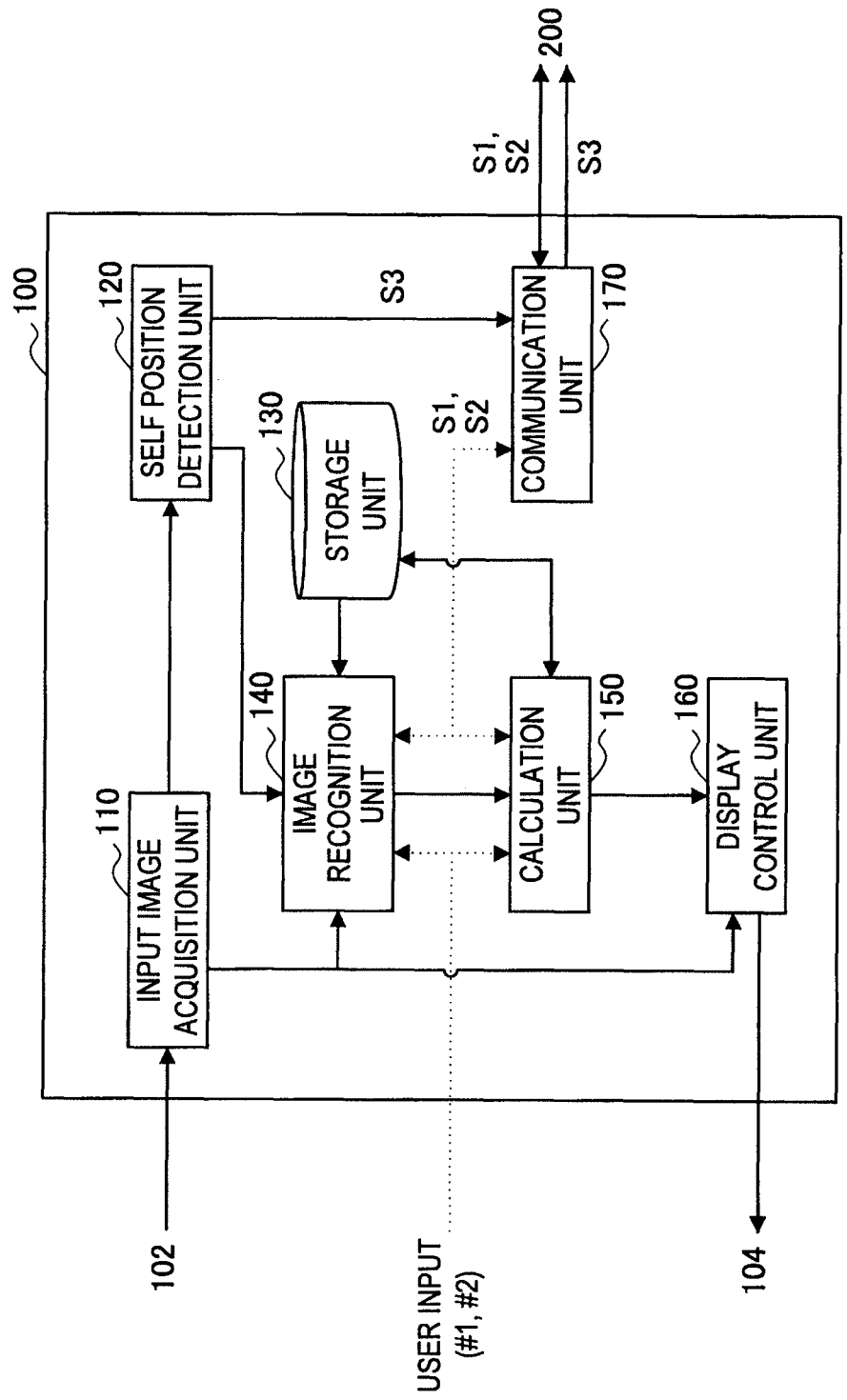
FIG. 4 is a block diagram illustrating an example of a configuration of an image processing apparatus according to an embodiment.

FIG. 4 is a block diagram illustrating an example of a configuration of the image processing apparatus 100 according to the present embodiment. As shown in FIG. 4, the image processing apparatus 100 includes an input image acquisition unit 110, a self position detection unit 120, a storage unit 130, an image recognition unit 140, a calculation unit 150, a display control unit 160, and a communication unit 170.

(Input Image Acquisition Unit)

The camera 102 takes an image of a real space to generate an input image, and the input image acquisition unit 110 obtains the input image thus generated. Then, the input image acquisition unit 110 outputs the obtained input image to the self position detection unit 120, the image recognition unit 140, and the display control unit 160.

(Self Position Detection Unit)

The self position detection unit 120 detects a position and a posture of the camera 102 in the real world. For example, the position of the camera 102 is represented by a three-dimensional position in an absolute coordinate system in the real world. For example, the posture of the camera 102 is represented by a quaternion or a Euler angle corresponding to a rotating matrix. For example, the self position detection unit 120 may detect the position and the posture of the camera 102 by using an input image provided by the input image acquisition unit 110 according to a principle of a SLAM technique described in "Real-Time Simultaneous Localization and Mapping with a Single Camera" (Proceedings of the 9th IEEE International Conference on Computer Vision Volume 2, 2003, pp. 1403-1410) by Andrew J. Davison. Alternatively, in a case where the camera 102 has a position sensor (for example, an optical position sensor) and a posture sensor (for example, a gyro sensor), the self position detection unit 120 may obtain the position and the posture detected by the sensors of the camera 102. For example, the self position detection unit 120 outputs the position and the posture of the camera 102, which are detected by means of any one of the above methods, to the image recognition unit 140 and the communication unit 170.

(Storage Unit)

The storage unit 130 uses a recording medium such as a hard disk or a semiconductor memory to store a manipulator image and object data in advance. The manipulator image is an image representing a manipulator used for manipulation of the virtual object displayed on the output image. On the other hand, the object data are data relating to the virtual object displayed by the HMD 104 in the mixed reality.

Figure 5A:
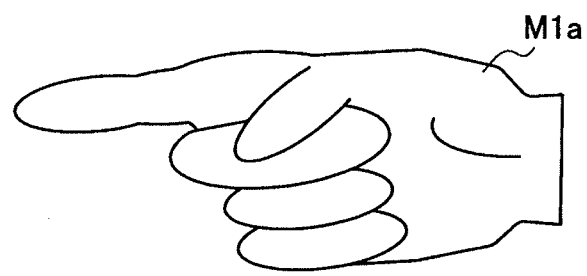
FIG. 5A is a schematic view illustrating an example of a manipulator according to an embodiment.
Figure 5B:
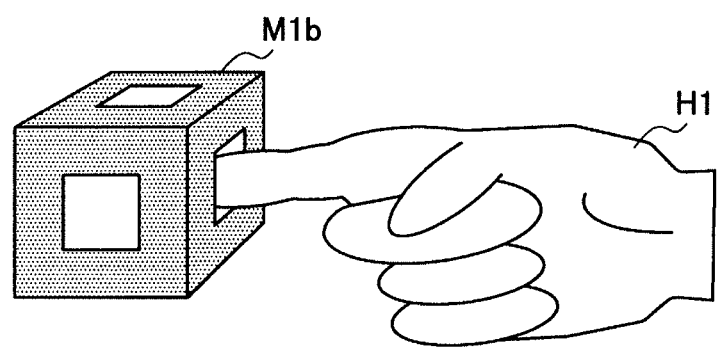
FIG. 5B is a schematic view illustrating another example of a manipulator according to an embodiment.

FIGS. 5A and 5B are schematic views each illustrating an example of a manipulator according to the present embodiment. In the example of FIG. 5A, a manipulator M1a is a hand of a user. In this case, the storage unit 130 stores, as a manipulator image, an image obtained by taking an image of the hand of the user in advance. For example, the storage unit 130 may store, as a manipulator image, a group of images obtained by taking images of the hand of the user from various different directions.

In the example of FIG. 5B, a manipulator M1b is a cubic marker which the user wears on a finger. A central portion of each surface of the marker is formed with a hole, into which the user can insert a finger to move the marker. In this case, the storage unit 130 stores, as a manipulator image, an image showing the marker in advance. Alternatively, for example, not only the marker but also the finger inserted into the marker may be collectively adopted as a manipulator, and the image showing the manipulator including the marker and the finger may be stored as the manipulator image.

It should be noted that the manipulator is not limited to the example shown in FIGS. 5A and 5B. For example, the manipulator may be any portion of a living body or any physical object existing in a real world, such as a foot of a user and a stick-like physical object held by a user. In response to a request given by the image recognition unit 140, the storage unit 130 outputs the manipulation image to the image recognition unit 140.

FIG. 6 is an explanatory view illustrating an example of object data stored in the storage unit 130. As shown in FIG. 6, the object data include three data items, i.e., an object ID, a shape, and a position. The "object ID" is an identifier for uniquely identifying a virtual object. The example of FIG. 6 includes object data of two virtual objects whose object IDs are V1 and V2. The "shape" is data representing the shape of a virtual object. For example, the shape of the virtual object can be represented as a polygon. The "position" is three-dimensional coordinate data representing the latest position of the virtual object. The position of the virtual object is updated as the user manipulates the manipulator. In response to a request given by the calculation unit 150, the storage unit 130 outputs the object data to the calculation unit 150.

(Image Recognition Unit)

The image recognition unit 140 recognizes the manipulator which is used for manipulation of the virtual object and which appears in the input image given by the input image acquisition unit 110 in a case where a first user-input representing a start of manipulation is detected. For example, the image recognition unit 140 can recognize the manipulator appearing in the input image by using the manipulator image stored in the storage unit 130. More specifically, for example, the image recognition unit 140 collates a partial image of the input image with the manipulator image by using a known pattern matching method. Further, the image recognition unit 140 recognizes the three-dimensional position of the manipulator in the real world based on a position at which the manipulator image is detected in the input image and based on the detected size of the manipulator image. The three-dimensional position of the manipulator recognized here is a relative position with respect to the position and the posture of the camera 102 at that moment. Further, the image recognition unit 140 uses the position and the posture of the camera 102 provided by the self position detection unit 120 to convert the relative three-dimensional position of the manipulator into a three-dimensional position in an absolute coordinate system in the real world. Then, the image recognition unit 140 outputs the converted position of the manipulator to the calculation unit 150. After the first user-input representing the start of manipulation is detected, the image recognition unit 140 repeats the image recognition processing on each frame of the series of input images until a second user-input representing an end of manipulation is detected. Then, when the second user-input representing the end of manipulation is detected, the image recognition unit 140 terminates the image recognition processing. Alternatively, for example, the image recognition unit 140 may recognize the manipulator appearing in the input image by using shape data representing the shape of the manipulator instead of the manipulator image.

The first user-input representing a start of manipulation and the second user-input representing an end of manipulation may be, for example, pressing of a predetermined button arranged on the image processing apparatus 100, a predetermined gesture performed by a user in the input image, or voice input by a user.

When the later-explained manipulation start signal is received by the communication unit 170, the image recognition unit 140 also executes the image recognition processing as explained above. In this case, the image recognition processing is repeated on each frame of the series of input images until the later-explained manipulation end signal is received by the communication unit 170. In this specification, the processings from the detection of the first user-input to the detection of the second user-input are referred to as manipulating-side processings. The processings from the reception of the first user-input to the reception of the second user-input are referred to observing-side processings.

(Calculation Unit)

When the first user-input representing the start of manipulation is detected, the calculation unit 150 calculates a position at which the HMD 104 displays the virtual object on a screen, according to a result of the recognition of the manipulator provided by the image recognition unit 140. Then, the calculation unit 150 not only outputs the calculated display position of the virtual object to the display control unit 160, but also updates position data of the virtual object stored by the storage unit 130. After the first user-input representing the start of manipulation is detected, the calculation unit 150 repeats the display position calculation processing of the virtual object, in accordance with the result of the recognition of the manipulator, on each frame of the series of input images until the second user-input representing the end of manipulation is detected.

Figure 7:
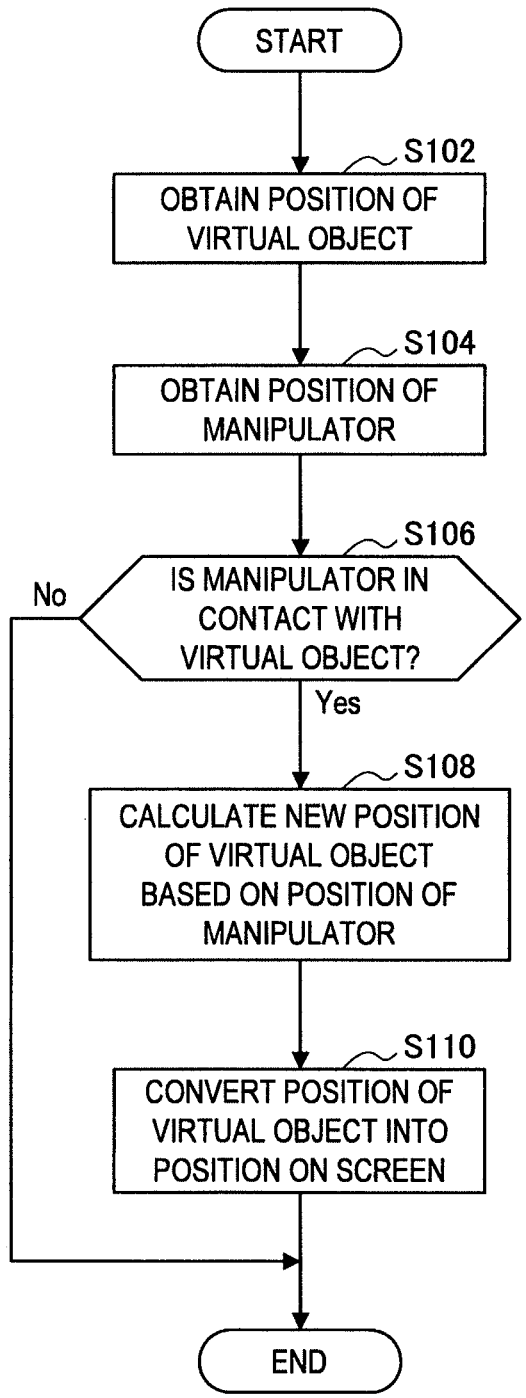
FIG. 7 is a flowchart illustrating an example of a flow of a display position calculation processing of a virtual object according to an embodiment.

FIG. 7 is a flowchart illustrating an example of a specific flow of a display position calculation processing of a virtual object according to the present embodiment which is performed by the calculation unit 150. As shown in FIG. 7, first, the calculation unit 150 obtains object data of each virtual object from the storage unit 130 (step S102). The object data obtained here include the latest position and the shape of each virtual object. Subsequently, the calculation unit 150 obtains the position of the manipulator recognized by the image recognition unit 140 (step S104). Subsequently, the calculation unit 150 determines whether the manipulator is in contact with the virtual object, based on the latest position and the shape of each virtual object and based on the position of the manipulator (step S106). Herein, when the manipulator is not in contact with the virtual object, the remaining processings are skipped. Subsequently, when the manipulator is in contact with the virtual object, the calculation unit 150 calculates the new position of the virtual object based on the position of the manipulator (step S108). For example, when the manipulator moves for a distance D in an X direction while the manipulator is in contact with the virtual object, the position of the virtual object moves for the distance D in the X direction according to the movement of the manipulator. Subsequently, the calculation unit 150 converts the new position of the virtual object from the three-dimensional position in the real world into a two-dimensional position on the screen of the HMD 104, based on the position and the posture of the camera 102 detected by the self position detection unit 120 (step S110). For example, the following equation based on a pinhole model can be used to convert the coordinate from the three-dimensional position into the two-dimensional position on the screen.

$$\lambda p' = AR(p-x) \quad \text{[Equation 1]}$$

In the equation (1), p denotes a three-dimensional position vector of the virtual object, x denotes a three-dimensional position vector of the camera 102, R denotes a rotating matrix corresponding to the posture of the camera 102, A denotes a camera internal parameter, and $\lambda$ denotes a parameter for normalization. On the other hand, p' denotes a two-dimensional position of the virtual object on the screen. Herein, the camera internal parameter A is given by the following equation in accordance with characteristics of the camera 102 in advance.

$$A = \begin{pmatrix} -f \cdot k_u & f \cdot k_u \cdot \cot\theta & u_O \\ 0 & -\dfrac{f \cdot k_v}{\sin\theta} & v_O \\ 0 & 0 & 1 \end{pmatrix} \quad \text{[Equation 2]}$$

Herein, f denotes a focal length, $\theta$ denotes an orthogonality of image axes (ideal value is 90 degrees), ku denotes a scale of a vertical axis of a focal plane (scale change rate from the absolute coordinate system in the real world to a coordinate system of the focal plane), kv denotes a scale of a horizontal axis of the focal plane, and (uo, vo) denotes a central position of the focal plane.

When the virtual object is represented with a polygon, the calculation unit 150 calculates two-dimensional positions, on the screen of the HMD 104, of respective apexes of the polygon based on the position and the posture of the camera 102.

Further, as the observing-side processings, the calculation unit 150 also executes the display position calculation processing of the virtual object as explained above, when the later-explained manipulation start signal is received by the communication unit 170. The display position calculation processing of this case is repeated on each frame of the series of input images, when the later-explained manipulation end signal is received by the communication unit 170. Further, when the communication unit 170 receives the manipulation end signal, the calculation unit 150 uses the position data of the virtual object included in the manipulation end signal to correct the position of the virtual object displayed by the display control unit 160 (and stored in the storage unit 130). This is a processing for solving a small displacement of the position of the virtual object, which is still remaining in a case where the display position calculation processing of the virtual object is carried out for the manipulating-person and the observing-person in parallel.

Even when the virtual object is not manipulated, the calculation unit 150 calculates the display position of the virtual object on the screen, based on the position data of the virtual object stored in the storage unit 130 and based on the position and the posture of the camera 102 detected by the self position detection unit 120. Then, the calculation unit 150 outputs the calculated display position of the virtual object to the display control unit 160.

(Display Control Unit)

The display control unit 160 displays the virtual object at the display position on the screen of the HMD 104 calculated by the calculation unit 150. For example, the display control unit 160 may generate an output image by overlaying the polygons representing the virtual objects on the input image provided by the input image acquisition unit 110, and may output the output image to the HMD 104. More specifically, for example, the display control unit 160 can draw polygons in the output image based on the coordinates of the apexes of the polygons of the virtual objects calculated by the calculation unit 150. As a result, in the output image displayed by the HMD 104 to the user, the virtual object moves as the manipulator moves, thus providing augmented reality to the user. For example, in a case where the HMD 104 is a see-through display, the display control unit 160 may project the polygons onto the screen of the HMD 104, based on the coordinates of the apexes of the polygons of the virtual objects calculated by the calculation unit 150.

(Communication Unit)

When the first user-input representing the start of manipulation is detected, the communication unit 170 transmits a first notification signal to another image processing apparatus 100, which displays the same virtual objects, so as to notify the start of manipulation. In this specification, the first notification signal is referred to as the manipulation start signal. When the second user-input representing the end of manipulation is detected, the communication unit 170 transmits a second notification signal to the another image processing apparatus 100, which displays the same virtual objects, so as to notify the end of manipulation. In this specification, the second notification signal is referred to as the manipulation end signal. In the present embodiment, the manipulation start signal and the manipulation end signal are transmitted to the another image processing apparatus 100 via the administration server 200.

FIG. 8A is an explanatory view illustrating the manipulation start signal according to the present embodiment. As shown in FIG. 8A, a manipulation start signal S1 includes four fields, i.e., a signal type, a source, an object ID, and an object position. The "signal type" is a field indicating that the signal in question is the manipulation start signal. The "source" is a field for identifying an image processing apparatus 100 that transmits the signal in question. The "object ID" is a field for identifying which virtual object is going to be manipulated. The "object ID" may enumerate object IDs of a plurality of virtual objects. The "object position" is a field arranged as necessary, and includes three-dimensional coordinate data representing the positions of the virtual objects at the start of manipulation. The "object ID" or the "object position" can be used to determine an image processing apparatus 100 to which the administration server 200 transfers the manipulation start signal.

FIG. 8B is an explanatory view illustrating the manipulation end signal according to the present embodiment. As shown in FIG. 8B, the manipulation end signal S2 includes four fields, i.e., a signal type, a source, an object ID, and an object position. The "signal type" is a field indicating that the signal in question is the manipulation end signal. The "source" is a field for identifying an image processing apparatus 100 that transmits the signal in question. The "object ID" is a field for identifying manipulation of which virtual object is going to be finished. The "object ID" may enumerate object IDs of a plurality of virtual objects. The "object position" includes three-dimensional coordinate data representing the positions of the virtual objects at the end of manipulation. The "object ID" or the "object position" can be used to determine an image processing apparatus 100 to which the administration server 200 transfers the manipulation end signal. Further, the image processing apparatus 100 having received the manipulation end signal can use the "object position" of the manipulation end signal S2 to correct the positions of the virtual objects at the end of manipulation.

In addition, the communication unit 170 transmits, with a regular interval (or every time a change occurs), a third notification signal to the administration server 200 so as to notify the position and the posture of the camera 102 detected by the self position detection unit 120. In this specification, the third notification signal is referred to as the self position notification signal.

FIG. 8C is an explanatory view illustrating the self position notification signal according to the present embodiment. As shown in FIG. 8C, the self position notification signal S3 includes three fields, i.e., a signal type, a source, and a position/posture. The "signal type" is a field indicating that the signal in question is the self position notification signal. The "source" is a field for identifying an image processing apparatus 100 that transmits the signal in question. For example, the "position/posture" includes a quaternion corresponding to the three-dimensional position and the rotating matrix of the camera 102 in the absolute coordinate system. The later-explained administration server 200 can recognize a visual field of each image processing apparatus 100, based on the self position notification signal S3 transmitted from each image processing apparatus 100 with a regular interval.

[2-2. Flow of Processing]

(Processing for Manipulating Side)

Figure 9:
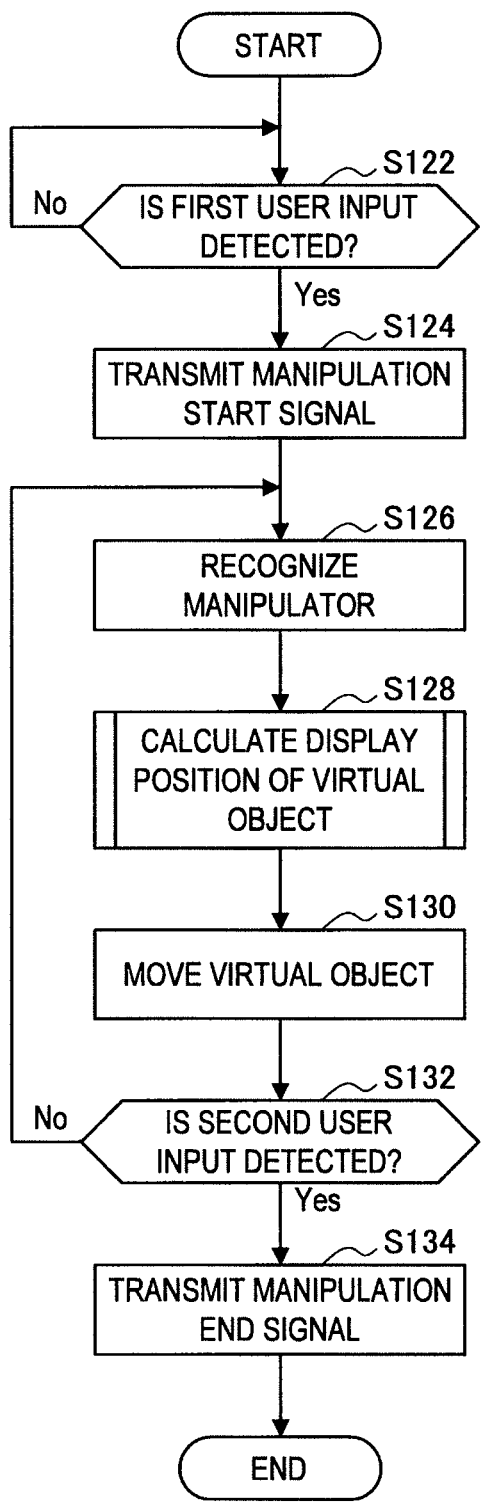
FIG. 9 is a flowchart illustrating an example of a flow of manipulating-side image processing according to an embodiment.

FIG. 9 is a flowchart illustrating an example of a flow of manipulating-side image processing performed by the image processing apparatus according to the present embodiment.

As shown in FIG. 8, first, the image recognition unit 140 and the calculation unit 150 monitor whether the first user-input is detected or not (step S122). When the first user-input is detected, the manipulating-side image processing in step S124 and subsequent steps are started. In the manipulating-side image processing, first, the communication unit 170 transmits the manipulation start signal S1 to the administration server 200 (step S124). Subsequently, the image recognition unit 140 uses the manipulator image stored in the storage unit 130 to recognize the manipulator in the input image, and outputs the position of the manipulator to the calculation unit 150 (step S126). Subsequently, the calculation unit 150 performs the display position calculation processing of the virtual object as explained with reference to FIG. 7 (step S128). Then, the display control unit 160 moves the virtual object displayed on the screen of the HMD 104 according to the position of the manipulator (step S130). Subsequently, the image recognition unit 140 and the calculation unit 150 determine whether the second user-input is detected or not (step S132). When the second user-input is not detected here, step S126 is subsequently performed, and steps S126 to S130 are repeated with respect to a subsequent frame of the input image. On the other hand, when the second user-input is detected, the communication unit 170 transmits the manipulation end signal S2 to the administration server 200 (step S134). Then, the manipulating-side image processing is terminated.

After the first user-input is detected, the communication unit 170 may wait until the manipulator is determined to be in contact with the virtual object as a result of the recognition of the manipulator provided by the image recognition unit 140 (in other words, after the determination result of step S106 in FIG. 7 becomes Yes), and may thereafter transmit the manipulation start signal to the administration server 200. In this case, the flow is different from the flow of FIG. 9. In the observing-side image processing, actual manipulation of the virtual object with the manipulator does not start. Therefore, there is a possibility that the start of the movement of the virtual object on the screen may be delayed, but this reduces the cost for the observing-side processing from the first user-input to the start of actual manipulation of the virtual object.

(Processing for Observing-Side)

Figure 10:
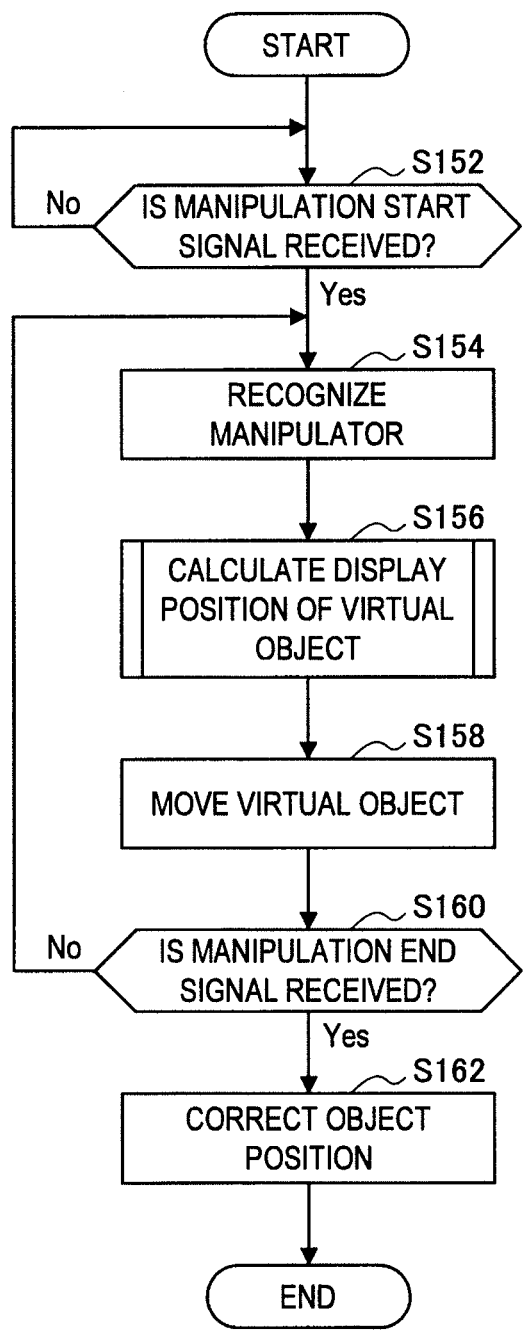
FIG. 10 is a flowchart illustrating an example of a flow of observing-side image processing according to an embodiment.

FIG. 10 is a flowchart illustrating an example of a flow of observing-side image processing performed by the image processing apparatus 100 according to the present embodiment.

As shown in FIG. 10, first, the communication unit 170 monitors whether the manipulation start signal is received or not (step S152). When the manipulation start signal is received, the observing-side image processing of step S154 and subsequent steps are started. In the observing-side image processing, first, the image recognition unit 140 uses the manipulator image stored in the storage unit 130 to recognize the manipulator in the input image, and outputs the position of the manipulator to the calculation unit 150 (step S154). Subsequently, the calculation unit 150 performs the display position calculation processing of the virtual object explained with reference to FIG. 7 (step S156). Then, the display control unit 160 moves the virtual object displayed on the display screen of the HMD 104 according to the position of the manipulator (step S158). Subsequently, the communication unit 170 determines whether the manipulation end signal is received or not (step S160). When the manipulation end signal is not received here, step S154 is subsequently performed again, and steps S154 to S158 are repeated with respect to a subsequent frame of the input image. On the other hand, when the manipulation end signal is received, the calculation unit 150 corrects the position of the virtual object (step S162). Then, the observing-side image processing is terminated.

<3. Explanation About Administration Server>

[3-1. Exemplary Configuration of Apparatus]

Figure 11:
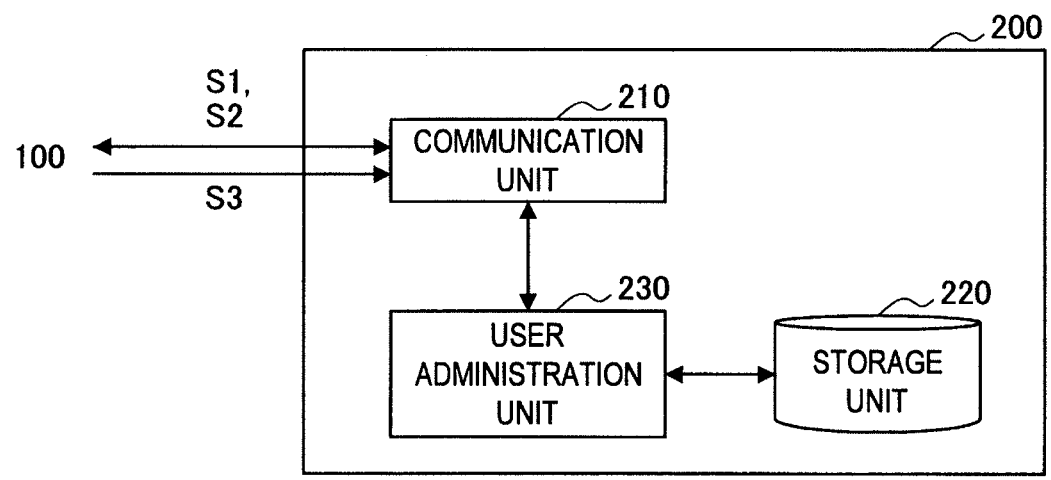
FIG. 11 is a block diagram illustrating an example of a configuration of an administration server according to an embodiment.
Figure 12:
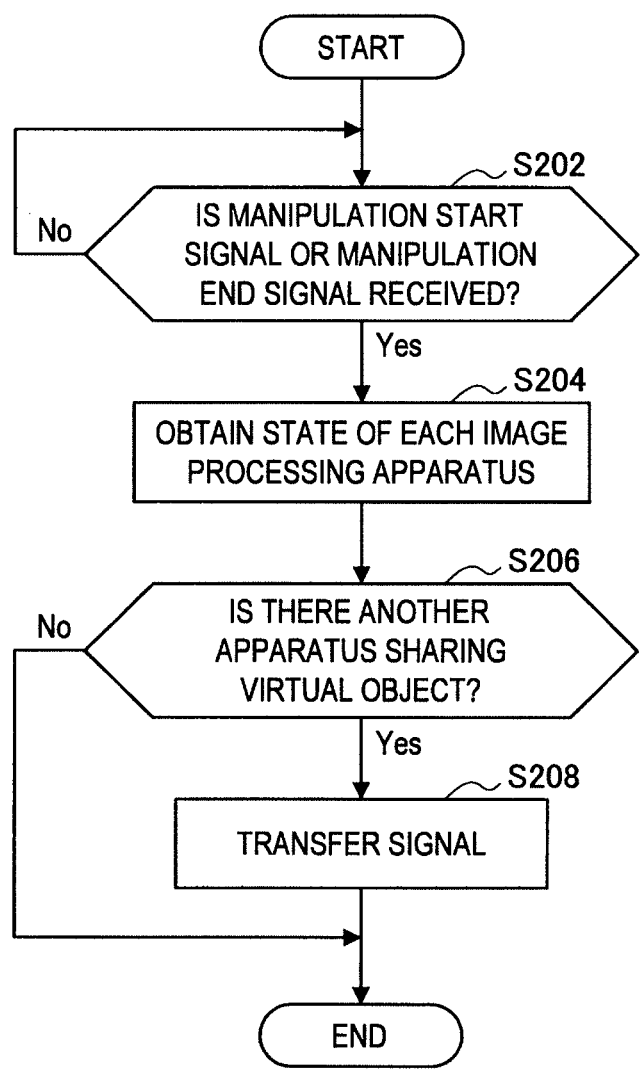
FIG. 12 is a flowchart illustrating an example of a flow of signal transfer processing according to an embodiment.

FIG. 11 is a block diagram illustrating an example of a configuration of the administration server 200 according to the present embodiment. As shown in FIG. 12, the administration server 200 includes a communication unit 210, a storage unit 220, and a user administration unit 230.

(Communication Unit)

The communication unit 210 transmits and receives a signal to/from the communication unit 170 of each image processing apparatus 100 via a wired communicative connection or a wireless communicative connection. A signal transmitted and received between the communication unit 210 of the administration server 200 and the communication unit 170 of each image processing apparatus 100 includes the manipulation start signal, the manipulation end signal, and the self position notification signal.

(Storage Unit)

The storage unit 220 uses a storage medium such as a hard disk or a semiconductor memory to store a database for managing a group of image processing apparatuses 100 displaying the same virtual object. For example, the database stored in the storage unit 220 includes data about the position and the posture of the camera 102 of each image processing apparatus 100 collected with a regular interval using the self position notification signal. In addition, for example, the database stored in the storage unit 220 may include the object ID of the virtual object which can be displayed by each image processing apparatus 100.

(User Administration Unit)

When the communication unit 210 receives the self position notification signal, the user administration unit 230 updates data, stored in the storage unit 220, about the position and the posture regarding the image processing apparatus 100 that transmits the self position notification signal in question. When the communication unit 210 receives the manipulation start signal or the manipulation end signal, the user administration unit 230 transfers the manipulation start signal or the manipulation end signal to another image processing apparatus 100 displaying the same virtual object as the source of the signal in question. For example, the user administration unit 230 may adopt, as an apparatus to which each signal is transferred, the image processing apparatus 100 associated with the object ID included in the manipulation start signal or the manipulation end signal in the database of the storage unit 220. Alternatively, for example, the user administration unit 230 may adopt, as an apparatus to which each signal is transferred, the image processing apparatus 100 whose camera 102 has a visual field including the position of the virtual object indicated by the manipulation start signal or the manipulation end signal.

[3-2. Flow of Processing]

FIG. 12 is a flowchart illustrating an example of a flow of signal transfer processing performed by the administration server 200 according to the present embodiment.

As shown in FIG. 12, first, the communication unit 210 monitors whether the manipulation start signal or the manipulation end signal is received or not (step S202). When the manipulation start signal or the manipulation end signal is received, step S204 is subsequently performed. Subsequently, the user administration unit 230 obtains the state of each image processing apparatus 100 from the storage unit 220 (step S204). The state of each image processing apparatus 100 obtained here may include the object ID of the virtual object displayed by each image processing apparatus 100 or the position and the posture of the camera 102 of each image processing apparatus 100. Subsequently, the user administration unit 230 determines whether there exists another image processing apparatus 100 sharing the virtual object (an apparatus other than the source of the manipulation start signal or the manipulation end signal) (step S206). When there exists no other image processing apparatus 100 sharing the virtual object, step S208 is skipped. On the other hand, when there exists another image processing apparatus 100 sharing the virtual object, the communication unit 210 transfers the manipulation start signal or the manipulation end signal to the another image processing apparatus 100 (step S208). Then, the signal transfer processing performed by the administration server 200 is terminated.

<4. Modification>

FIG. 13 is a schematic view illustrating an image processing system according to a modification of the present embodiment. FIG. 13 shows an image processing system including image processing apparatuses 300a, 300b and 300c. The image processing apparatus 300a, 300b and 300c are used by users Ua, Ub and Uc, respectively. These apparatuses can communicate with each other via a wired communicative connection or a wireless communicative connection.

Typically, the image processing apparatuses 300a, 300b and 300c have configurations equivalent to the image processing apparatus 100 as explained with reference to FIG. 4. However, communication units 170 of the image processing apparatuses 300a, 300b and 300c directly transmit and receive the manipulation start signal and the manipulation end signal without relying on the administration server 200. For example, when the communication unit 170 receives the manipulation start signal, the image processing apparatuses 300a, 300b and 300c perform as follows: only in a case where the image processing apparatuses 300a, 300b and 300c display the same virtual object as the source of the signal in question, the image recognition unit 140 recognizes the manipulator. In this case, for example, whether it is necessary to recognize the manipulator or not is determined based on the object ID or the position data of the virtual object included in the manipulation start signal.

For example, in the example of FIG. 13, the image processing apparatuses 300a, 300b share a virtual object V1. In other words, both of the HMD 104a of the image processing apparatus 300a and the HMD 104b of the image processing apparatus 300b can display the virtual object V1. On the other hand, the image processing apparatus 300c does not share the virtual object V1. Instead of sharing the virtual object V1, the HMD 104c of the image processing apparatus 300c can display a different virtual object V2. In this kind of example, the following case will be assumed: the user Ua is a person who manipulates the virtual object V1, and the user Ua starts manipulation of the virtual object V1 by pressing a button 106a of the image processing apparatus 300a. In such case, the image processing apparatus 300a detects a first user-input, and transmits the manipulation start signal S1 to the image processing apparatus 300b and the image processing apparatus 300c. For example, the manipulation start signal S1 includes the object ID or the position data of the virtual object V1. When the image processing apparatus 300b receives the manipulation start signal S1, the image processing apparatus 300b determines, based on the object ID or the position data included in the signal in question, start of manipulation of the virtual object V1 which is going to be displayed by the image processing apparatus 300b. As a result, the image processing apparatus 300b starts tracking of the manipulator (such as a hand of the user Ua or a marker) by means of image recognition. On the other hand, the image processing apparatus 300c determines, based on the object ID or the position data included in the manipulation start signal S1, that the signal in question is not related to virtual objects which are going to be displayed by the image processing apparatus 300c. As a result, the image processing apparatus 300c disregards the manipulation start signal S1 received from the image processing apparatus 300a.

<5. Summary>

The embodiment and the modification of the present invention have been hereinabove explained with reference to FIG. 1 to FIG. 13. According to the present embodiment, when the first user-input representing the start of manipulation is detected, the manipulating-side image processing apparatus recognizes the manipulator appearing in the input image obtained by taking an image of the real space, and as a result of the recognition, the manipulating-side image processing apparatus controls display of the virtual object. Further, the manipulation start signal is transmitted from the manipulating-side image processing apparatus to the observing-side image processing apparatus. Accordingly, the observing-side image processing apparatus also recognizes the manipulator appearing in the input image obtained by taking an image of the real space, and as a result of the recognition, the observing-side image processing apparatus can control display of the virtual object. By this, since the manipulating-side apparatus as well as the observing-side apparatus track the manipulator by means of the image recognition, a delay due to transfer of the tracking result does not occur. Moreover, the manipulation start signal includes the position data of the virtual object or the object ID for recognizing the virtual object. Therefore, the image processing apparatus that does not share the virtual object does not have to execute unnecessary image recognition processing. In a case where the second user-input representing the end of manipulation is detected, the manipulation end signal is transmitted from the manipulating-side image processing apparatus to the observing-side image processing apparatus. Accordingly, while the virtual object is not manipulated, none of the image processing apparatuses does not have to execute the image recognition processing. As described above, according to the present embodiment, the manipulating-side apparatus as well as the observing-side apparatus track the manipulator by means of the image recognition, and in addition, the image recognition processing is activated according to timing based on the signal exchanged between the apparatuses. Therefore, a mixed reality can be provided while effectively reducing the processing load and reducing the mismatch between the state of real world and the state of virtual objects.

According to the present embodiment, the manipulation end signal transmitted from the manipulating-side image processing apparatus to the observing-side image processing apparatus includes the position data representing the position of the virtual object at the end of manipulation. By this, even when there is a temporary error between a tracking result of the manipulator generated by the manipulating-side image processing apparatus and a tacking result of the manipulator generated by the observing-side image processing apparatus, the observing-side image processing apparatus can correct the position of the virtual object.

Alternatively, after the first user-input is detected, the manipulating-side image processing apparatus may wait until the manipulator is determined to be in contact with the virtual object, and may thereafter transmit the manipulation start signal. In this case, the load of the observing-side image recognition processing can be further reduced.

The manipulation start signal and the manipulation end signal can be transmitted and received between the image processing apparatuses by way of the administration server that manages the group of image processing apparatuses. In this case, when the administration server transfers the signal only to the image processing apparatuses that display the same virtual object, the load of the observing-side image recognition processing can be further reduced and unnecessary traffic can be eliminated.

The series of processings performed by the image processing apparatuses 100 and 300 and the administration server 200 as explained in this specification is typically achieved with software. For example, programs constituting the software for realizing the series of processings are stored in advance in a storage medium arranged in each apparatus or outside of each apparatus. For example, each program is loaded to a RAM (Random Access Memory) during execution, and is executed by a processor such as a CPU (Central Processing Unit).

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-038777 filed in the Japan Patent Office on Feb. 24, 2010, the entire content of which is hereby incorporated by reference.

What is claimed is:

1. A virtual object manipulating apparatus comprising:
an input image acquisition unit for obtaining an input image generated by taking an image of a real space;
an image recognition unit for recognizing, when a first user-input representing a start of manipulation is detected, a manipulator used for manipulating a virtual object, wherein the manipulator appears in the input image;
a calculation unit for calculating, according to a result of the recognition of the manipulator provided by the image recognition unit, a position on a screen of a display device at which the virtual object is to be displayed;
a display control unit for displaying the virtual object at the position of the screen of the display device calculated by the calculation unit; and
a communication unit for transmitting, when the first user-input is detected, a first notification signal for notifying the start of manipulation to a virtual object observing apparatus displaying the same virtual object as displayed on the screen of the display device,
wherein the virtual object observing apparatus begins tracking the manipulator by means of image recognition, based on the first notification signal, upon receiving the first notification signal transmitted from the communication unit of the virtual object manipulating apparatus.

2. The virtual object manipulating apparatus according to claim 1,
wherein the first notification signal includes identification data for identifying the virtual object or position data representing a position of the virtual object.

3. The virtual object manipulating apparatus according to claim 1,
wherein, when a second user-input representing an end of manipulation is detected, the communication unit transmits a second notification signal to the virtual object observing apparatus so as to notify the end of manipulation.

4. The virtual object manipulating apparatus according to claim 3,
wherein the second notification signal includes position data representing a position of the virtual object calculated by the calculation unit.

5. The virtual object manipulating apparatus according to claim 1,
wherein the image recognition unit also recognizes the manipulator appearing in the input image when the communication unit receives the first notification signal from another apparatus.

6. The virtual object manipulating apparatus according to claim 5,
wherein the image recognition unit does not recognize the manipulator when the first notification signal received by the communication unit is not related to virtual objects which are to be displayed by the virtual object manipulating apparatus.

7. The virtual object manipulating apparatus according to claim 1,
wherein the communication unit transmits the first notification signal to the virtual object observing apparatus, when the first user-input is detected and thereafter the manipulator is determined to be in contact with the virtual object as a result of the recognition of the manipulator provided by the image recognition unit.

8. The virtual object manipulating apparatus according to claim 1,
wherein the communication unit transmits the first notification signal to an information processing apparatus that manages a group of apparatuses displaying the same virtual object.

9. The virtual object manipulating apparatus according to claim 8,
wherein the first notification signal includes identification data for identifying the virtual object or position data representing a position of the virtual object, and the first notification signal is transferred via the information processing apparatus to another apparatus of the group of apparatuses that is displaying the same virtual object.

10. The virtual object manipulating apparatus according to claim 1, further comprising:
a storage unit storing a manipulator image representing the manipulator,
wherein the image recognition unit uses the manipulator image stored in the storage unit to recognize the manipulator appearing in the input image.

11. The virtual object manipulating apparatus according to claim 1, wherein the manipulator is a physical object.

12. The virtual object manipulating apparatus according to claim 1, wherein the communication unit transmits, when the first user-input is detected, the first notification signal to the virtual object observing apparatus to trigger the virtual object observing apparatus to start a recognition of the manipulator, a calculation of the position on a screen of the virtual object observing apparatus at which the virtual object is to be displayed, and a displaying of the virtual object at the calculated position of the screen of the virtual object observing apparatus.

13. The virtual object manipulating apparatus according to claim 1, wherein the virtual object observing apparatus is located remote from and at a different location than a location of the virtual object manipulating apparatus.

14. The virtual object manipulating apparatus according to claim 13, wherein the display control unit displays the virtual object at the position of the screen of the display device to have a first perspective that is different than a display by the virtual object observing apparatus of the same virtual object according to a second perspective.

15. The virtual object manipulating apparatus according to claim 1,
wherein the image recognition unit also recognizes the manipulator appearing in the input image, when the communication unit receives a signal notifying of a start of manipulation from another apparatus.

16. An image processing method performed by a virtual object manipulating apparatus, comprising the steps of:
obtaining an input image generated by taking an image of a real space;
detecting a first user-input representing a start of manipulation;
transmitting a first notification signal to a virtual object observing apparatus displaying the same virtual object as a virtual object which is to be manipulated by the virtual object manipulating apparatus so as to notify a start of manipulation;
recognizing a manipulator, appearing in the input image, that is used for manipulation of the virtual object;

calculating, according to a result of the recognition of the manipulator, a position on a screen of a display device at which the virtual object is to be displayed; and displaying the virtual object at the calculated position of the screen of the display device, wherein the virtual object observing apparatus begins tracking the manipulator by means of image recognition, based on the first notification signal, upon receiving the first notification signal transmitted from the virtual object manipulating apparatus.

17. A non-transitory computer-readable medium having embodied thereon a program, which when executed by a processor of a virtual object manipulating apparatus causes the processor to perform a method, the method comprising:

obtaining an input image generated by taking an image of a real space;

recognizing, when a first user-input representing a start of manipulation is detected, a manipulator used for manipulating a virtual object, wherein the manipulator appears in the input image;

calculating, according to a result of the recognition of the manipulator, a position on a screen of a display device at which the virtual object is to be displayed;

displaying the virtual object at the calculated position of the screen of the display device; and transmitting, when the first user-input is detected, a first notification signal for notifying the start of manipulation to a virtual object observing apparatus displaying the same virtual object as displayed on the screen of the display device, wherein the virtual object observing apparatus begins tracking the manipulator by means of image recognition, based on the first notification signal, upon receiving the first notification signal transmitted from the communication unit of the virtual object manipulating apparatus.

18. An image processing system including two or more image processing apparatuses, each of the image processing apparatuses configured to perform at least one of manipulating a virtual object and observing the virtual object, wherein each of the image processing apparatuses comprises:

an input image acquisition unit for obtaining an input image generated by taking an image of a real space;

an image recognition unit for recognizing, when a first user-input representing a start of manipulation is detected, a manipulator used for manipulating the virtual object, wherein the manipulator appears in the input image;

a calculation unit for calculating, according to a result of the recognition of the manipulator provided by the image recognition unit, a position on a screen of a display device at which the virtual object is to be displayed;

a display control unit for displaying the virtual object at the position of the screen of the display device calculated by the calculation unit; and a communication unit for transmitting, when the first user-input is detected, a first notification signal for notifying the start of manipulation from an image processing apparatus of the two or more image processing apparatuses that is performing the manipulation of the virtual object to another one of the two or more image processing apparatuses that is observing the virtual object and displaying the same virtual object, wherein the image recognition unit of one of the two or more image processing apparatuses also recognizes the manipulator appearing in the input image, when the communication unit receives the first notification signal from another one of the two or more image processing apparatuses, and wherein the another one of the two or more image processing apparatuses that is observing the virtual object begins tracking the manipulator by means of image recognition, based on the first notification signal, upon receiving the first notification signal transmitted from the communication unit of the image processing apparatus of the two or more image processing apparatuses that is performing the manipulation of the virtual object.

* * * * *